US006938003B2

(12) United States Patent
Harpale (10) Patent No.: US 6,938,003 B2
(45) Date of Patent: Aug. 30, 2005

(54) METHOD AND APPARATUS FOR A CREDIBILITY REPORTING SYSTEM TO AUGMENT AN ONLINE EXCHANGE

(76) Inventor: Mahesh Harpale, 13, Crefeld Ct., Lincoln Park, NJ (US) 07035

( * ) Notice: Subject to any disclaimer, the term of this patent is extended or adjusted under 35 U.S.C. 154(b) by 662 days.

(21) Appl. No.: 09/895,563

(22) Filed: Jun. 30, 2001

(65) Prior Publication Data
US 2002/0002512 A1 Jan. 3, 2002

Related U.S. Application Data (60) Provisional application No. 60/215,526, filed on Jun. 30, 2000.

(51) Int. Cl.$^7$ ............................................. G06F 17/60
(52) U.S. Cl. ...................................................... 705/26
(58) Field of Search ..................................... 705/26, 27

(56) References Cited

U.S. PATENT DOCUMENTS

| 6,018,724 A | 1/2000 | Arent ........................... 705/44 |
| 6,064,980 A | 5/2000 | Jacobi et al. .................. 705/26 |
| 6,067,528 A | 5/2000 | Breed et al. ................... 705/26 |
| 6,073,839 A | 6/2000 | Mori et al. .................. 235/380 |
| 6,078,924 A | 6/2000 | Ainsbury et al. ........... 707/101 |
| 6,405,175 B1 * | 6/2002 | Ng ............................... 705/14 |
| 6,415,270 B1 * | 7/2002 | Rackson et al. .............. 705/37 |
| 2002/0073008 A1 * | 6/2002 | Dutta et al. .................... 705/37 |

FOREIGN PATENT DOCUMENTS

WO    WO 2004/097550 A2 * 11/2004

OTHER PUBLICATIONS

Mannix, Margaret "Who's been naughty and who's been nice.", U.S. News & World Report, Sep. 27, 1999. Retrieved from Dialog File: 148, Acc#: 11369168.*

* cited by examiner

Primary Examiner—Wynn W Coggins
Assistant Examiner—Naeem Haq (57) ABSTRACT

A method and apparatus for capturing trade-action data pertaining to credibility of participants, across multiple independent electronic marketplaces, in an online business. The invention utilizes a publicly or privately accessible service provider computer program that uniquely identifies user's credentials across multiple independent marketplaces, and non-intrusively records trade action data at specific stages of the transaction. Service provider computer program correlates, and analyzes recorded trade actions, and transaction patterns to create credibility ratings that show efficiency and effectiveness of the transaction performed. Credibility ratings aid in decision making process by disclosing true intention of participants to make a successful online transaction based on earlier captured trade actions to provide uniform ratings by capturing specific set of data across multiple independent exchanges and tracking uniform transaction patterns. In one or more embodiments the invention utilizes a computer program that interfaces with an exchange computer program for the electronic marketplace to provide notification of trade actions. Service provider computer program provides validation of user and exchange credentials by using locally stored encrypted data and provides mapping to identify user across multiple independent exchanges.

2 Claims, 8 Drawing Sheets

METHOD AND APPARATUS FOR A CREDIBILITY REPORTING SYSTEM TO AUGMENT AN ONLINE EXCHANGE

CROSS-REFERENCE TO RELATED APPLICATIONS

This application is entitled to the benefit of Provisional Patent Application Ser. No. 60/215,526, filed 2000 Jun. 30.

BACKGROUND

1. Field of Invention

This invention relates to electronic marketplace that facilitates electronic trade, more particularly to trade credibility of participants.

2. Description of Prior Art

Electronic Commerce enables trade participants to initiate trade, and exchange trade related information electronically to improve the efficiency of the transaction. Electronic commerce helps in reducing latency in a transaction life-cycle and also reducing manual intervention with automated processes. Marketplaces are where participants initiate a trade and carry out a transaction provided requirements of all the parties meet. An Electronic Marketplace or an online exchange provides tools to facilitate electronic commerce between trade participants. There are different types of exchanges depending upon type of transactions and participants e.g. one-to many, many-to-one, and many-to-many. One-to-many exchange can be Online-Procurement system wherein there is one buyer and many vendors preferred or otherwise. Many-to-one business exchange can be Online Sales system where there is one supplier and many buyers. Many-to-many business exchange can be an online-product or online-service exchange where there are many buyers and many suppliers controlling the transactions by the supply-demand forces. Similarly, depending upon participants, exchange can be private or public. Private exchange involves fixed group of known participants. Public exchange involves any suitable participant with trade done anonymously or with disclosed identity.

Even though electronic commerce and electronic marketplaces are introduced to reduce manual intervention and increase efficiency, there still exist interventions and process latencies that add to the overheads of the transaction and reduce efficiency. This reduces overall effectiveness of electronic commerce as the transactions are delayed or are aborted because of the delay. There are several causes to this problem that are not addresses in the solutions that exist today.

Fraud or casual analysis of participants wastes important resources and time of counterparts. This causes the credibility of the exchange or marketplace to go down and turns away serious and legitimate participants. Effectiveness and efficiency are very important criteria in a business transaction that saves important resources for the participants giving them direct return on investment. Participants are not able to add automated process to trade with selected counterparts depending upon past effectiveness and efficiency to complete a transaction. Serious and legitimate participants are unable to add their effective and efficient business processes and practices to their competitive advantage. This is a serious shortcoming in the process of the existing electronic marketplaces. Currently, there are several marketplaces that have their own participants and work independently. If credibility is tracked uniformly and consistently across these independent marketplaces, then it adds a new value to this solution by giving an independent and a consistent rating system. Also, for the solution to become operationally useful, it needs to be non-intrusive to existing online exchanges.

Currently there are no solutions that address the above mentioned problems and shortcomings. Currently there is business, financial, and credit reporting done by tracking financial position of the business, and by tracking and analyzing accounting books. This does not depict efficiency and effectiveness with which the business has performed in business transactions. Thus they do not address shortcomings as mentioned previously. Also these reports are not real-time and thus lose value for electronic marketplaces that operate with real-time information and transactions.

Individual marketplaces present transaction reports for participants. However, they fail to track and correlate specific trade actions that give the true intention of the participant to complete the transaction. These reports fail to cover initiated but incomplete transactions. Also, the reports do not track efficiency of a participant to complete a transaction. Since, data collected, analysis, and ratings are limited to individual marketplace, they limit scope and value of the reports. Also, since these reports are not tracked independently they reduce the value.

There are some systems that ask participants to fill review applications at the end of the transaction and produce a report by analyzing reviews. However, this introduces an additional step in the process that is not directly related to the commerce. So, participants can be reluctant to fill the review and reports miss on vital data. This reduces the overall effectiveness of the analysis and ratings produced. Also, since the data collected is not based transactions but on personal opinion, credibility of the rating is largely affected and hence reduces utility.

Present invention gives a method and apparatus that addresses above mentioned shortcomings and problems. Also, it provides a completely new and unique way of identifying credibility of trade-participants. Present invention when implemented increases efficiency and effectiveness of electronic commerce and augments value of existing online exchanges. Present invention tracks trade actions at specific steps of a transaction non-intrusively across independent marketplaces, collects and analyzes the data to produce credibility ratings that disclose intention of a participant to make a successful transaction.

SUMMARY

In accordance with the present invention, credibility reporting system comprises a method and apparatus for capturing trade-action data pertaining to credibility of participants non-intrusively in online business transactions.

Objects and Advantages

Accordingly several objects and advantages of the present invention are:

(a) to provide fairness in online business transactions, done anonymously or otherwise, by keeping record of trade actions and analyzing them to build a credibility-report;

(b) to provide aid in decision making process by disclosing true intention of participants to make a successful online transaction based on earlier captured trade actions;

(c) to provide monitoring facility across multiple independent exchanges that solves operational difficulty of tracking participants trade actions globally;

(d) to provide uniform ratings by capturing specific set of data across multiple independent exchanges and tracking uniform transaction patterns;

(e) to provide operational ease of use by non-intrusive integration with existing online exchange software.

DRAWING FIGURES

In the drawings, closely related figures have the same number but different alphabetic suffixes. These and other features and advantages of the invention will now be described with references to the drawings of certain preferred embodiments, which are intended to illustrate and not to limit the invention, and in which:

FIGS. 1–6 are preferred embodiments, FIGS. 8A–8B are additional embodiments, and FIGS. 7A–7C are alternative embodiments.

FIGS. 3A and 3B are flowcharts for user mapping software of exchange computer program and user registration software of service computer program respectively.

REFERENCE NUMERALS IN DRAWINGS

In the drawings, the first digit of each reference number indicates the Figure number in which the referenced item first appears.

100—service provider Web site
102—Web server at service provider Web site 100
104—HTML documents at service provider Web site 100
106—computer program for processing requests at service provider Web site 100
108—database to store information at service provider Web site 100
120—exchange Web site 120
122—Web server at exchange Web site 120
124—HTML documents at exchange Web site 120
126—computer program for processing requests at exchange Web site 120
140—standard computer used by exchange-user
142—standard Web browser
146—certificate used as an identity for customers of service provider Web site 100
160—Internet
180—standard computer used by exchange administrator
200—standard computer used by any customer of service provider Web site 100
222—enrollment database at service provider Web site 100
242—enrollment data sent by exchange-user
300—user credentials
301—user registration identifier
302—exchange credentials
304—registration database at service provider Web site 100
400—user action data sent by exchange-user
404—user action database are service provider Web site 100
500—report sent by exchange Web site 120 to exchange-user
502—report sent by service provider Web site 100 to exchange Web site 120
600—data containing unique name identifier and password sent by exchange-user
700—data containing enrollment data 242, user registration identifier 301, and exchange credentials 302
800—user mapping database at exchange Web site 120

DESCRIPTION OF PREFERRED EMBODIMENT—FIGS. 1–6

To facilitate a complete understanding of the invention, the description of the preferred embodiment is arranged within the following sections:
GLOSSARY OF TERMS AND ACRONYMS
COMPONENT DESCRIPTION
OPERATION
ADVANTAGES
ADDITIONAL EMBODIMENTS
ALTERNATIVE EMBODIMENTS
Glossary of Terms and Acronyms:

The following terms and acronyms are used throughout the description:

Client-Server: A model of interaction in a distributed system in which one program sends a data-processing request to another independent program. The requesting program is called the "client", and the program that responds to the request is called the "server".

Internet: A collection of interconnected (public or private) networks that are linked together by a set of standard protocols. Internet allows two computers on two disparate networks to connect and send requests to each other.

World Wide Web ("Web"): A distributed collection of inter-linked, user-viewable hypertext documents (commonly referred as Web documents or Web pages) that are accessible via the Internet. It is also used herein to refer to the client and server software components, which provide user-access to such documents using standardized Internet protocols.

Web Site: A computer system that serves informational content over a network using the standard protocols of World Wide Web. Typically, a Web site corresponds to a particular Internet domain name, such as "bizcredibility.com". As used herein, the term is generally intended to encompass the hardware/software server components that server the informational content over the network Web Server: Web server is a software component of a Web site that accepts HTTP requests and serves informational content with the help of static HTML documents or other software components helping to create dynamic HTML documents or combination of both.

Web Browser: Web browser is a software component at the client side that accesses the informational content from Web server. Web browser accesses informational content and renders it on the client screen.

HTTP (Hyper Text Transport Protocol): The standard World Wide Web client-server protocol used for the exchange of information. HTTP includes a number of different types of messages that can be sent from the client to the server to request different types of server actions. HTTP GET request sends a message to server to access a document. HTTP POST request sends a message to server to process data and includes data in the message.

HTML (Hyper Text Markup Language): A standard coding convention and fixed set of codes for attaching presentation and linking attributes to informational content within documents.

XML (Extensible Markup Language): A standard coding convention and set of codes for format data in such a way that it allows static file documents to be parsed into a repository by standard way. XML is extensible so that the set of codes or tags can be defined based on type of the document. HTML is a fixed format that defines a way to describe information in one specific class of documents, while XML is an extensible format that lets you define your own customized markup language for different classes of documents.

HTTPS (Secure Hyper Text Transport Protocol): The secure World Wide Web client-server protocol that encrypts the documents before sending and decrypts it after receipt. It uses a secure socket layer on top of HTTP protocol.

CGI ("Common Gateway Interface"): A standard for running external programs at Web server that typically generates a dynamic response to the browser's request.

Web Server Plug-in ("Plug-in"): Standard extension to the Web server that allows a request to be served dynamically by executing a set of server side instructions.

Online Exchange ("Exchange", "Electronic Marketplace"): A privately or publicly accessible computer program allowing users to buy or sell commodities or services electronically. Buyer and seller interact using the electronic documents with Online Exchange facilitating this electronic commerce. For example, a Web site accessible using Internet and World Wide Web providing online exchange services.

Exchange-user ("User"): As used herein, a user who registers to trade commodities or services on an exchange.

Service Provider Web Site ("Service Web site", "Service Provider Application", "Service Provider Computer Program"): A privately or publicly accessible computer program providing its services to record user actions and make available electronically a credibility-report for a customer. For example, a Web site accessible using Internet and World Wide Web providing required services.

Cryptographic One Way Hash function: A cryptographic hash function H is a standard cryptographic transformation that takes an input m and returns a fixed-size string, which is called the hash value h (that is, h=H (m)). The basic requirements for a cryptographic hash function are as follows: input can be of any length, output has a fixed length, H (x) is relatively easy to compute for any given x, H (x) is one-way, H (x) is collision-free. A hash function H is said to be one-way if it is hard to invert, where "hard to invert" means that given a hash value h, it is computationally infeasible to find some input x such that H (x)=h. A strongly collision-free hash function H is one for which it is computationally infeasible to find any two messages x and y such that H (x)=H (y). (Source: http://www.rsasecurity.com/rsalabs/faq)

Figure 1:
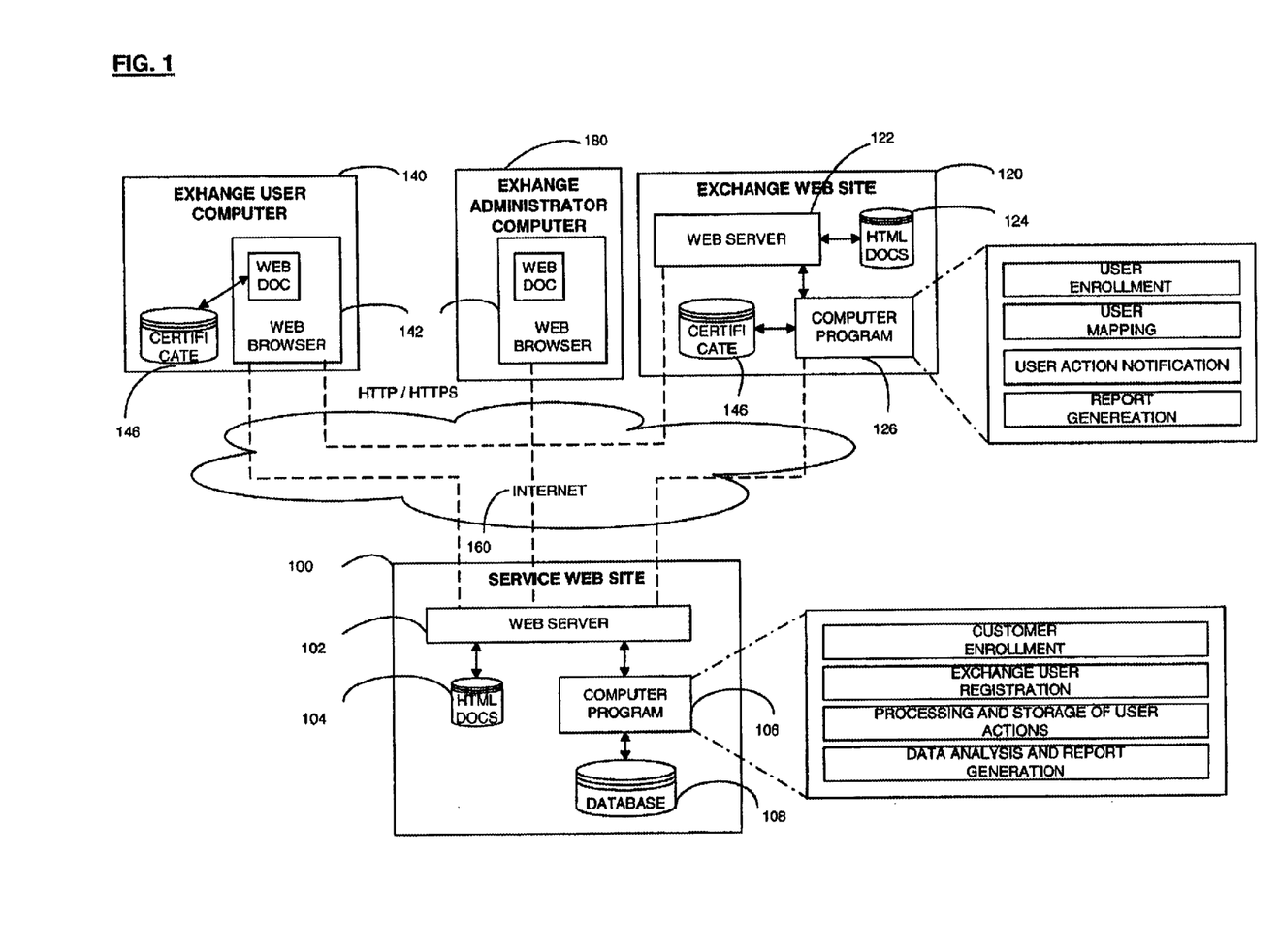
FIG. 1 is a high level architectural drawing of the primary components of a system that operates according to the present invention.

Component Description:

FIG. 1 illustrates a general architectural drawing of the primary components of a system that operates according to the present invention. The system includes a service provider Web site 100, an exchange Web site 120, exchange-administrator computer 180, and an exchange-user computer 140 all linked together by the Internet 160. Exchange-user computer 140 and exchange-administrator computer 180 may be any type of computing device that allows a user to access Internet using a Web browser 142.

An exchange-user conducts trade transactions using exchange Web site 120 and a Web browser 142. For example, exchange-user A, who wants to sell an item, can post that request online using exchange Web site 120 and exchange-user B who wants to buy that item can bid on that item online. If trade conditions are satisfactory, then trade takes place between exchange-user A and B online using exchange Web site 120.

Exchange Web site 120 is a Web site provides functionality for allowing customers to purchase or sell commodities or services online. Exchange Web site 120 consists of three primary components: Web server 122, HTML documents 124, and computer program 126. Web Server 122 is an HTTP server that accepts a user request and generates a response to be sent back to the user. It can generate the response using HTML documents 124 and/or using a computer program 126. HTML documents 124 provide the static information content while computer program 126 does processing and/or provides dynamic information content. Computer program 126 is either a CGI application or a Web server plug-in.

Computer program 126 used by exchange Web site 120 performs five basic functions in context of the present invention: processing of the exchange functions, user enrollment, user mapping, user action notification, and credibility-report generation. Exchange functions are the transaction processing functions that facilitate the exchange user to buy or sell commodities or services online. User enrollment, user mapping are functions to ascertain the identity of the exchange-user. User action notification is function to keep record of the user activity. Credibility-report generation is a function to produce credibility-reports that facilitate decision-making process in online trade transactions. Computer program 126 uses service provider Web site 100 to provide user enrollment, user mapping, user action notification, and credibility-report generation functions.

Service provider Web site 100 consists of three primary components: Web server 102, HTML documents 104, computer program 106, and database 108. Web server 102 is an HTTP server that accepts HTTP requests and provides HTML/XML documents back. Web server 102 uses HTML documents 104 to provide the static information content and a computer program 106 to process the requests and/or to provide dynamic information content. Computer program 106 provides following four basic functions: customer enrollment illustrated in FIGS. 2A–2B, exchange-user registration illustrated in FIGS. 3A–3C, processing and storage of user actions FIGS. 4A–4C, and data analysis and report generation FIGS. 5A–5C, 6.

Figure 2A:
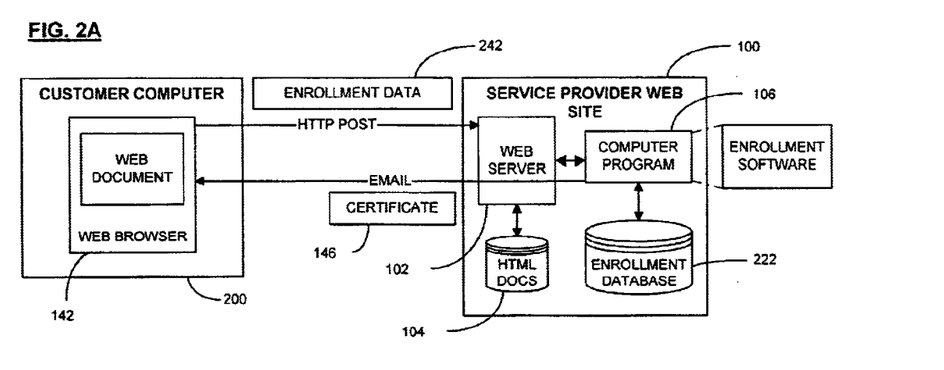
FIG. 2A is a drawing illustrating the primary components involved in a customer enrollment function.
Figure 2B:
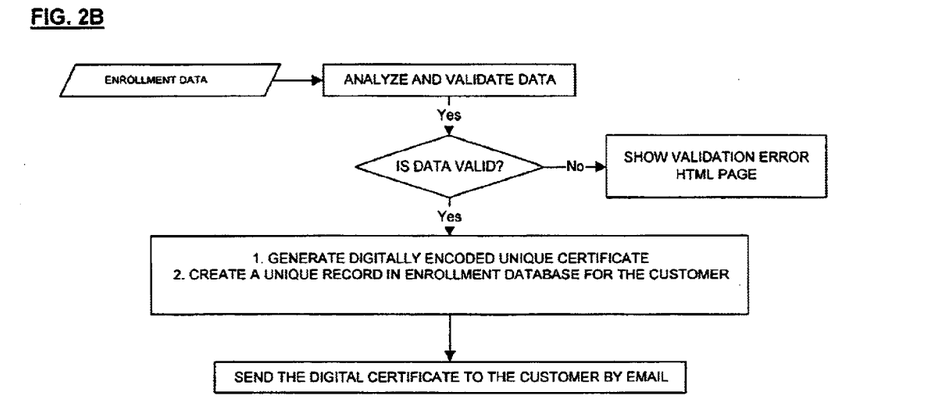
FIG. 2B is a flowchart of the customer enrollment function.

Customer enrollment function provides enrollment of exchange and exchange user for the credibility-report generation services. Customer enrollment function processes an enrollment data 242 and stores it in enrollment database 222, and generates a certificate 146, used to maintain and validate customer identity. Certificate 146 is digitally encrypted identity information about the customer used for security identification. To provide additional security service provider Web site 100 uses HTTPS as the communication protocol. Customer for enrollment is exchange-user as well as exchange since identity is maintained for both. Customer uses customer computer 200 that is either exchange-user computer 140 or exchange-administrator computer 180. Since exchange-user can conduct trade transactions on more than one exchange, by unique certificate 146 exchange-user's identity will be maintained independent of the exchange on which the exchange-user is conducting transactions.

Figure 3A:
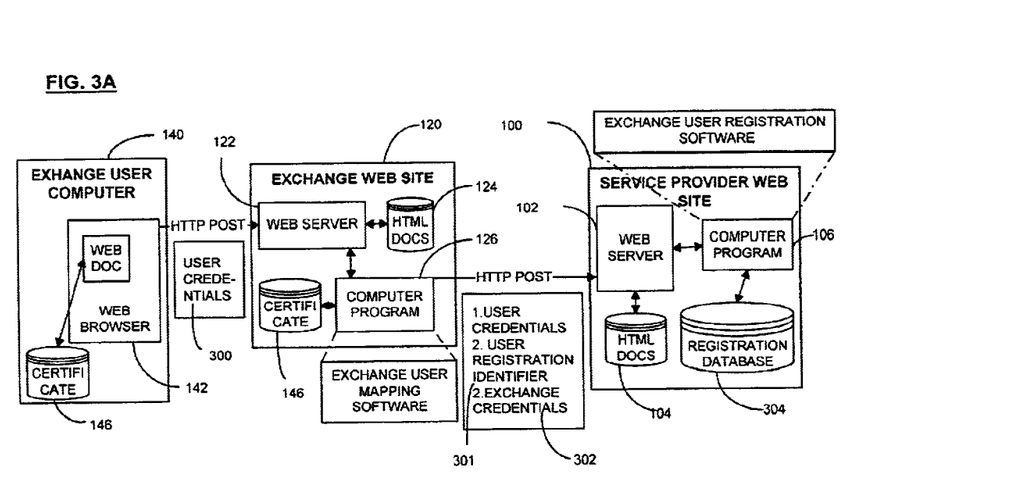
FIG. 3A illustrates a registration function for an exchange-user.
Figure 3B:
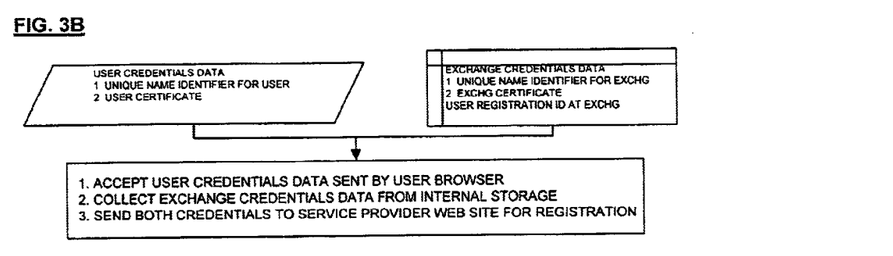
Figure 3C:
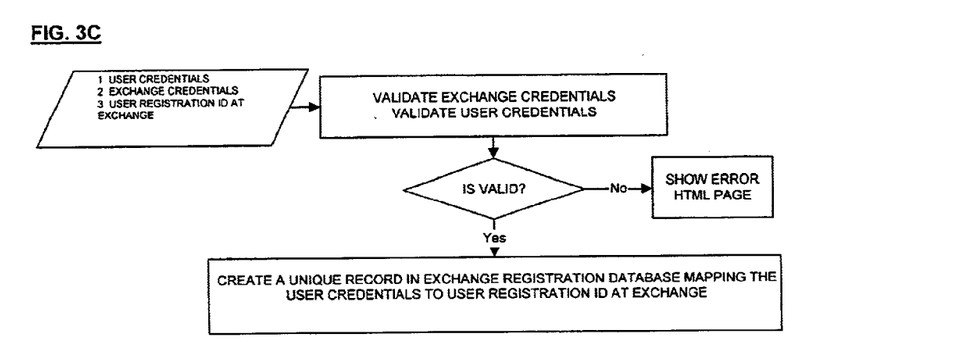

Typically, an exchange registers a user at the exchange for the user to conduct transactions and creates its own user registration identifier 301 for the user. Exchange-user registration function provides mapping of the customer identity certificate to user registration identifier 301 for the exchange. Once the mapping is done, each exchange uses its own user registration identifier 301 instead of the identification certificate 146 of the user for further requests. This facilitates the non-intrusive interaction between exchange computer program 126 and the service provider Web site 100 with minimal changes at exchange Web site 120 and without breach of security. Computer program 106 at service provider Web site 100 accepts user credentials 300, user registration identifier 301, and exchange credentials 302 passed by computer program 126 at exchange Web site 120 and creates the mapping record in registration database 302. User credentials 300 are user name and certificate 146 for user identification. Exchange credentials 302 are exchange name and certificate 146 for exchange identification. To illustrate the user-mapping function, for example, exchange-user John Smith has identity certificate "XYZ" at service provider Web site. He has registered with exchange A with registration identifier "sjohn" and with exchange B with registration identifier "jsmith". Exchange-user mapping function will create mapping records as "XYZ"-"sjohn"-"exchange A" and "XYZ"-"jsmith"-"exchange B"

Figure 4A:
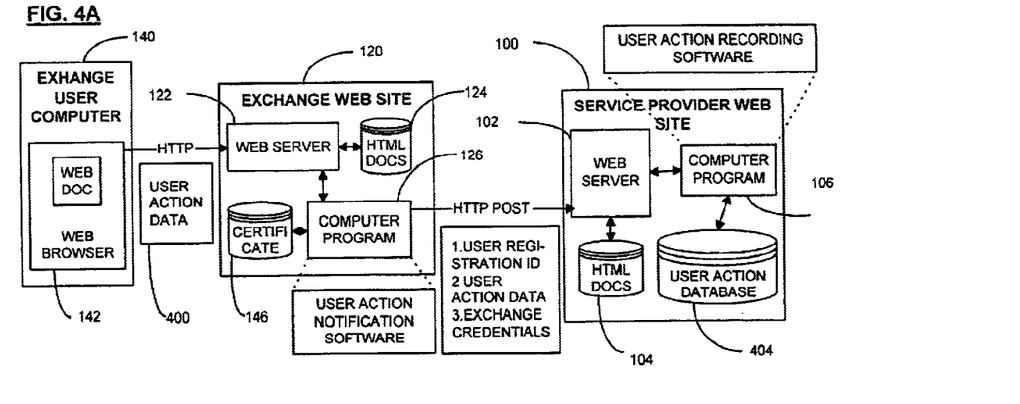
FIG. 4A illustrates a user action notification function.
Figure 4B:
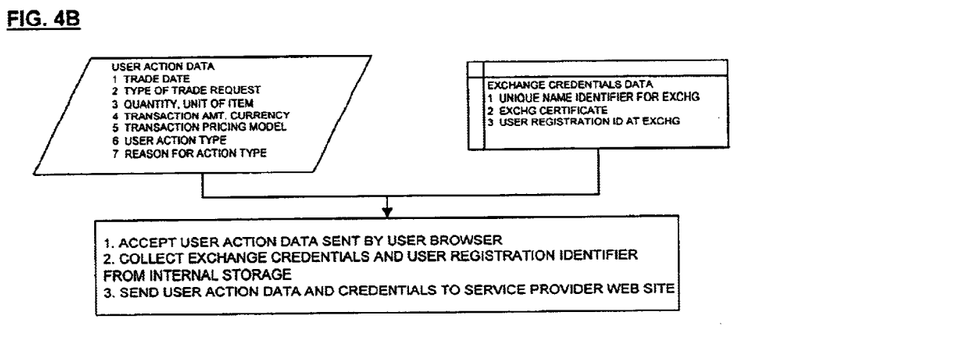
FIGS. 4B and 4C are flowcharts for user action notification software of exchange computer program and user action recording software of service computer program respectively.
Figure 4C:
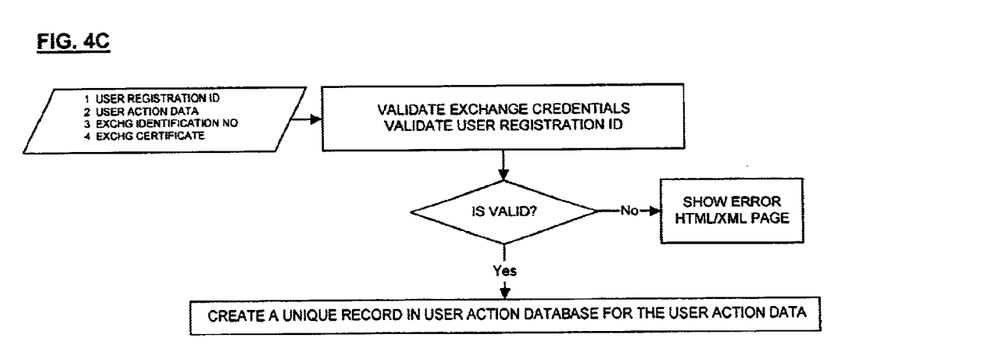

Whenever exchange-user takes an action to trade or to proceed to trade on exchange, exchange notifies service provider Web site. When exchange-user takes an action to trade or to proceed to trade, exchange-user provides trade-related user action data 400 to the exchange. Along with the exchange related processing exchange also notifies service provider Web site about this event and provides data consisting of user registration identifier 301, trade-related user action data 400, and exchange credentials 302. User action data 400 consists of information about the trade that an exchange-user is participating. User action data 400 includes, but is not limited by, following information: trade date, type of trade request, quantity and unit of item, total transaction amount and currency, transaction pricing model, user action type, and specific reason for action type (if applicable), exchange-registration identifier of counter-party (if applicable). Types of trade request are buy request and sell request. Transaction pricing models are fixed price transactions and dynamically priced transactions. User action types are posting a trade request, bidding on a trade request, initiating a transaction with suitable counter-parties, completing a transaction, and rejecting a transaction. Reasons for action type is used for justification of user actions deciding the positive or the negative impact on user credibility ratings. For example reason types for rejecting a trade are counter-party did not respond, specifications did not match, financial problems. There are specific positive and negatives weights associated with each reason. Service provider Web site 100 records this information in user action database 404.

Computer program 106 at service provider Web site 100 analyzes the data collected about an exchange-user and produces credibility-reports on demand depicting the credibility of that exchange-user to honor a trade. Exchange Web site 120 shows these reports to exchange-user before, during or after initiating a trade facilitating the decision-making process for the exchange-user. To get the report computer program 126 at exchange Web site 120 sends a request to service provider Web site 100 along with exchange-user registration identifier 301 and exchange credentials 302. Computer program 106 at service provider Web site 100 fetches the exchange-user related data from user action database 404, analyzes it and generates the report 502 in XML format. Computer program 126, at exchange Web site 120, parses the report and sends the report 500 in HTML format. Exchange-user or exchange administrator can also access the report on demand online using customer computer 200, Web browser 142, and service provider Web site 100. Service provider Web site 100 accepts data containing unique name identifier and password 600 that had been included in the enrollment data and generates the report in HTML format.

Service provider Web site 100 is the site owned and operated by an individual or business entity that may not be in the same business as that of the exchange Web site 120. An exchange-user typically trades in more than one exchange Web site 120 and a service provider Web site 100 provides service to such exchange Web site 120. Exchange Web site 120 focuses on the function of trading related transaction processing while service provider Web site 100 focuses on recording exchange-user's trade related actions on all the exchanges that the user trades in. Service provider Web site analyzes the recorded data and generates reports that are useful to all exchanges, other users, and the exchange user itself.

Operation

Service provider Web site 100 provides four basic services: customer enrollment, exchange-user registration, processing and storage of user actions, and data analysis and report generation. These four operations are illustrated in FIGS. 2A–2B, 3A–3C, 4A–4C, 5A–5C, and 6.

In customer enrollment service FIGS. 2A–2B, service provider Web site 100 validates and stores the enrollment data, and gives an identity certificate to the customer. Exchange Web site 120 and exchange-user are customers of service provider Web site 100. Customer uses customer computer 200, Web browser 142, and Internet 160 to access service provider Web site 100. FIG. 2A illustrates the customer enrollment operation. Service provider Web site 100 includes enrollment software that implements an online registration process for allowing exchanges and exchange-users to enroll as customers. FIG. 2B illustrates flowchart for enrollment software. Web server 102 at service provider Web site 100 accepts enrollment data as an HTPP POST request from the customer browser 200. It, then, forwards the data to computer program 106 that implements enrollment software. Enrollment data includes a unique customer name identifier, customer password, and customer profile information. Enrollment software analyzes and validates enrollment data and sends an error if the data is invalid or insufficient. If the data is valid, it creates a unique encrypted hash value, "a certificate" 146, that is directly related to the enrollment information, using a cryptographic one way hash function as described above in glossary. The information that is sensitive such as user password is also encrypted. An acknowledgement and the certificate are then electronically mailed to the customer to be used in service access. Data containing unique name identifier, and password 600 and certificate 146 for exchange-user are considered as user credentials 300. Data containing unique name identifier, and password 600 and certificate 146 for exchange are considered as exchange credentials 302.

To illustrate the operation, for example, there is an exchange-user "John Smith", two separate exchange Web sites 120, "metalexchange.com" and "steelexchange.com", and a service provider Web site 100 "bizcredibility.com". "John Smith" enrolls for the credibility services with "bizcredibility.com", uses unique name identifier "jsmith", password as "password", and receives certificate "A53FRTBWOMLOA234A53FRTBWOMLOA234", which is unique encrypted value relating to its enrollment data. Similarly, "steelexchange.com" and "bizcredibility.com" enroll with "bizcredibility.com" use their respective names as unique name identifiers, password as "password", and receive certificates "M458IREIUNJDKJD3M458IREIUNJDKJD3" and "SER376SUYJ843JHESER376SUYJ843JHE" respectively.

Exchange Web site 120 typically uses a registration identifier 301 for the users who want to trade at the exchange. Typically, exchange-user trades at more than one exchange and has more than one registration identifier 301. This poses an operational difficulty since the credibility data needs to be tracked for exchange-user independent of exchange Web site 120. Service provider Web site 100 solves this problem by mapping exchange-user credentials against the registration identifier 301 and exchange credentials. FIG. 3A illustrates the exchange-user registration operation. For existing or new exchange-users, computer program 126 at exchange Web site 120 includes a user mapping software that sends a request to service provider Web site 100. FIG. 3B illustrates flowchart for user mapping software. User mapping software accepts user credentials 300 from an exchange-user, retrieves user registration identifier 301 and exchange credentials 302 from its database, and passes this data to service provider Web site 100 using the HTTP POST request. Computer 106 at service provider Web site 100 includes exchange-user registration software to record mapping data in registration database 304. FIG. 3C illustrates flowchart for this software. This software validates user and exchange credentials, and creates a record in its registration database 304 storing the mapping data.

Continuing with the example described previously, exchange-user "John Smith" has registration identifier "john_metal" with "metalexchange.com" and "john_steel" at "steelexchange.com" by which these exchange Web sites 120 track users identity. To identify "John Smith" uniquely trading at both these exchange Web sites 120 as "john_steel" and "john_metal", service provider Web site "bizcredibility.com" creates two mapping records for each exchange Web site 120. For "metalexchange.com", the record mapping is as follows: "jsmith", "A53FRTBWOMLOA234A53FRTBWOMLOA234", "metalexchange.com", "M458IREIUNJDKJD3M458IREIUNJDKJD3", "john_metal" For "steelexchange.com", the record mapping is as follows: "jsmith", "A53FRTBWOMLOA234A53FRTBWOMLOA234", "steelexchange.com", "SER376SUYJ843JHESER376SUYJ843JHE", "john_steel"

Service provider Web site 100 records the trade related user action data 400 of an exchange-user enrolled and registered with it. It accepts these requests to record the user action data 400 from an exchange Web site 120 enrolled with it. FIG. 4A illustrates the operation of user action notification and storage. When exchange-user participates in a trade, it sends such a request to exchange Web site 120. Computer program 206 at exchange Web site 120 includes user action notification software to service the request. FIG. 4B illustrates flowchart for user action notification software. This software accepts user action data 400, retrieves user registration identifier 301 and exchange credentials 302, and sends a HTTP POST request along with the data to service provider Web site 100. Computer program 106 at service provider Web site includes user action recording software to service the request. FIG. 4C illustrates flowchart for user action recording software. This software accepts data, and validates user registration identifier and exchange credentials. If data is invalid, it sends an error page in XML or HTML format back. If data is valid, then it creates a unique record in user action database 404 recording user action data 400. User action data 400 consists of information about the trade that an exchange-user is participating. User action data 400 includes, but is not limited by, following information: trade date, type of trade request, quantity and unit of item, total transaction amount and currency, transaction pricing model, user action type, and specific reason for action type (if applicable), exchange-registration identifier of counter-party (if applicable).

Continuing with the example described previously, exchange-user "John Smith" posts a request at exchange Web site 120, "metalexchange.com", to sell 10 tons of steel at a fixed price of $239000.00 on Jul. 4, 1999. Exchange Web site 120, "metalexchange.com", processes the request and also notifies service provider Web site 100, "bizcredibility.com". It passes data as follows: "john_metal", "metalexchange.com", "M458IREIUNJDKJD3M458IREIUNJDKJD3", "SELL:STEEL:10:TONS:FIXED PRICE:239000.00:$:07041999" Service provider Web site 100, "bizcredibility.com", validates exchange credentials 302, maps user "john_metal" as user "sjohn", and records this data in its user action database 404.

Figure 5A:
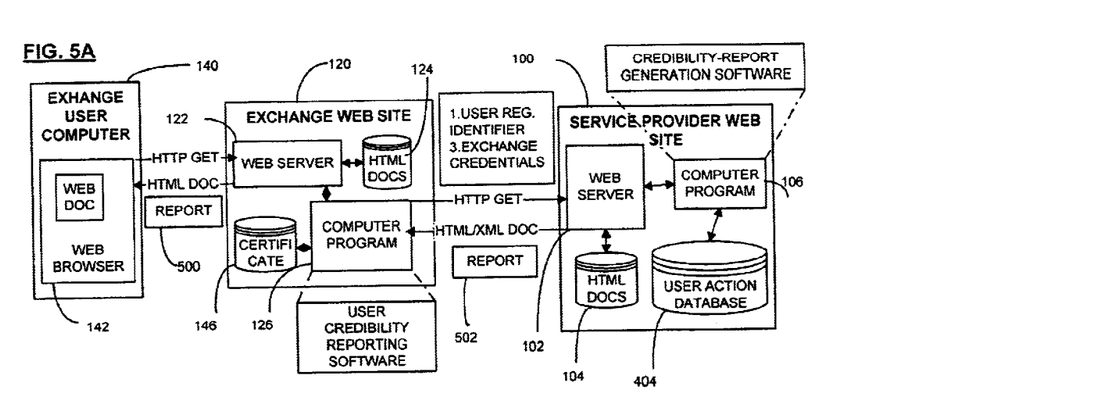
FIG. 5A illustrates a credibility-report generation function.
Figure 5B:
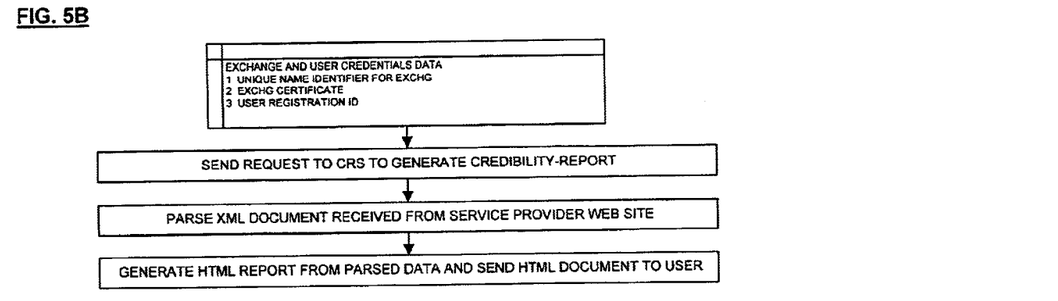
FIGS. 5B and 5C are flowcharts for user credibility-report generation software of exchange computer program and credibility-report generation software of service computer program.
Figure 5C:
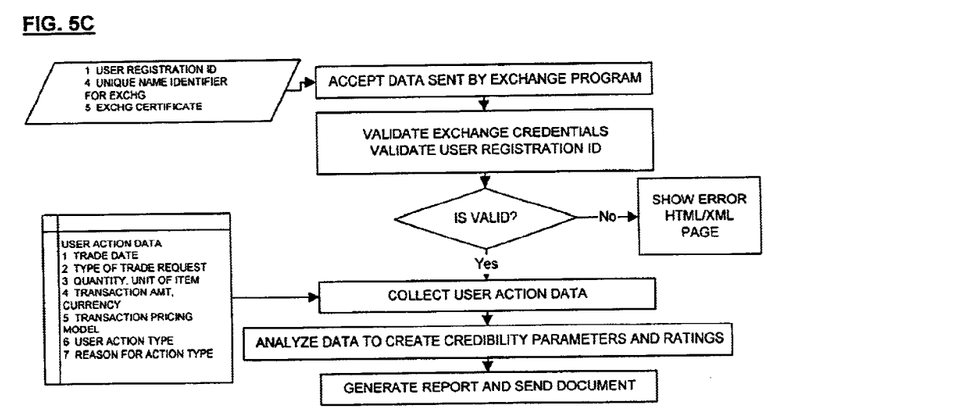

Exchange Web site 120 requests service provider Web site for the credibility-report for an exchange-user. Exchange Web site 120 discloses the credibility-report information to exchange-users, which intend to trade or are involved in a trade. FIG. 5A illustrates the process. Exchange Web site 120 sends an HTTP GET request to service provider Web site 100 and retrieves a credibility-report 502 in XML format. Computer program 126 at exchange Web site 120 includes credibility-report generation software to perform the operation. FIG. 5B illustrates flowchart for credibility-report generation software. The software retrieves exchange-user registration identifier and exchange credentials and sends a request to service provider Web site 100 for credibility-report. It parses the data received and generates a report in suitable format to show it to its members. Computer program 106 at service provider Web site 100 includes credibility generation software to service the request. FIG. 5C illustrates flowchart for credibility-report generation software. The software accepts, and validates exchange credentials 302 and exchange-user registration identifier 301. If the credentials are valid, it retrieves the user action data 400 stored in its user action database 404. The software analyzes this data to generate various parameters that impact credibility-report. The parameters that are included, but are not limited, in the credibility-report generation process are as follows: average time duration between consecutive transactions, average time duration to complete a transaction, inactivity time for last transaction, number of posting to trade, average quantity of trade, average amount of transactions in specific currency, number of bids for a trade, average number of bids on a particular trade, number of initiations of a transaction with suitable counter-parties, number of transaction completed, number of transaction rejected, number of positive and negative points collected based on reasons for action types. Credibility-report consists of a report of the important parameters and rating generated by software for the exchange-user based on these parameters. Additionally, exchange Web site 120 can opt for above-mentioned data selectively. The software can generate the report in various format included in, but not limited by, XML, HTML, PDF, Word for Windows® document, and Excel spreadsheet for Windows®. For exchange Web site 120 request preferred format in XML.

Continuing with the example described previously, exchange Web site 120, "metalexchange.com" sends an HTTP request to service provider Web site 100, "bizcredibility.com" to retrieve credibility-report 502 for exchange-user "John Smith". It sends data as follows: "john_metal", "metalexchange.com", "M458IREIUNJDKJD3M458IREIUNJDKJD3" Service provider Web site 100, "bizcredibility.com", validates exchange credentials 302, maps user "john_metal" as user "sjohn", and retrieves its user action data 400 from user action database 404. It analyzes this data and creates report containing various parameters, and rating based on them as follows:

Average time duration between consecutive transactions: 27 days
Average time duration to complete a transaction: 12 days
Inactivity time for last transaction: 4 months
Number of posting to trade: 17 for buy, 24 for sell
Average quantity of trade: 27 units for buy, 51 units for sell
Average amount of transactions in specific currency: $139,256.00 for buy, $325,943.00 for sell
Number of bids for a trade: 29 for buy, 20 for sell
Average number of bids on a particular trade: 3.75 for buy, 1.5 for sell
Number of initiations of a transaction with suitable counter-parties: 17 for buy, 24 for sell
Number of transaction completed: 14 for buy, 20 for sell
Number of transaction rejected: 3 for buy, 4 for sell
Number of positive points: 16
Number of negative points: 5
Credibility rating: 0.6125

Figure 6:
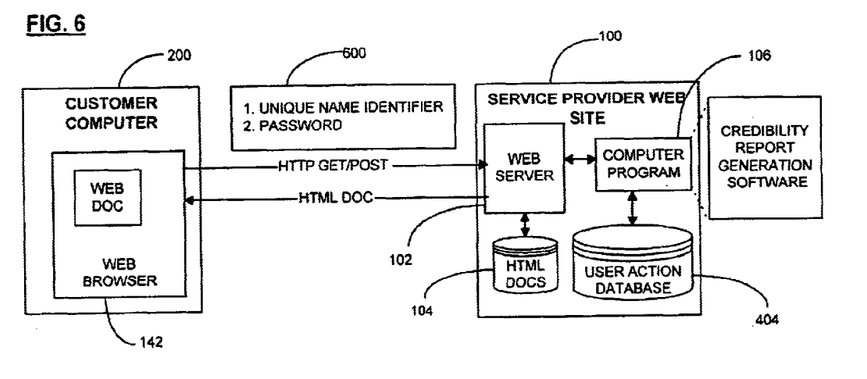
FIG. 6 illustrates an online report access function.

A customer can also access this report online by accessing service provider Web site 100. A customer can be exchange-user or exchange-administrator that is enrolled with service provider Web site. FIG. 6 illustrates this process in which a customer sends an HTTP GET request to service provider Web site 100 to access the credibility-report 502. Service provider Web site accepts unique name identifier and password. Credibility report generation software validates the data and if valid, generates a credibility-report 502 as described previously. A customer can specify the report format for a credibility-report 502 in its request.

Although the preferred embodiment described here uses Web technology to disseminate information, any of a variety of document types and electronic dissemination technologies can be used. Further, even though preferred embodiment describes the basis of credibility-report to be primarily online exchange transactions, this system additionally can also take into account the business transactions of the user conducted in traditional ways.

The preferred embodiment currently uses HTTP as the primary protocol to locate, and access Web documents, uses HTML as primary language to encode Web documents, and uses XML as primary language to encode Documents. However, the present invention is also intended to encompass future markup languages and transport protocols that may be used in place of (or an addition to) HTML, XML, and HTTP. Similarly, for reliable identification instead of service provider generated certificate, other unique identity forms marketed by third party companies such as "RSA Security, Inc" or "VeriSign, Inc" can also be used.

Advantages:

From the description, a number of advantages of the present invention are evident:

(a) The present invention lets exchange-users build their credibility in a business transaction by virtue of the successful online transactions they make or their various trade actions disclosing their true intention to make a successful transaction. This system augments the fairness of online business transactions that are done anonymously or otherwise by keeping the record of the trade actions and analyzing them to build a credibility-report.

(b) Credibility-report discloses track record of the all participants. Credibility-report forms a strong success factor for a business transaction. This helps an exchange-user, which intends to do business with other participants, in decision-making process of choosing right candidate. Also, exchange-user can shortlist participants on the basis of their credibility-report rating.

(c) Credibility-report that is based on the successful track record of an exchange-user also gives the user a fair advantage in competitive trading. So it is in the interest of an exchange user to build the credibility rating by successfully completing transactions. This can also be valued as an intangible asset of a business.

(d) It is also in the interest of the exchanges to have the businesses that are transacting on their trading floor to be monitored and their credibility metered. It adds to the value of the services that the exchange offers as well as to the credibility of the exchange itself. Exchange may limit the exchange-users based upon their credibility-report. This can force the participants of an online business transaction to post true information and to honor the transaction terms.

(e) An exchange-user transacting on multiple exchanges faces difficulty in maintaining uniform credibility ratings, if each exchange tracks this information independent of other exchanges. So it is in the interest of exchange-user to have transactions recorded, analyzed and reported globally.

(f) Every exchange creates a separate identity for every exchange-user registered to trade at its exchange. This poses operational problems for an exchange to track user transactions globally. The present invention as described above allows user's identity to be tracked uniquely across exchanges without compromising security or privacy of the user.

(g) The unique process as described above allows non-intrusive transactions between exchange and the credibility-report service provider with no modifications in the existing software. The process allows service provider to generate report across participating exchanges with only two minimum additional software processes at exchange site i.e. user-mapping process and user action notification process. So, the invention makes the process integration with existing processes of an exchange very easy.

(h) By capturing similar data for all participating exchanges system, system tracks uniform transaction patterns adding to the correctness of the report.

(i) As described above, this system is useful for all the three types of online business exchanges namely one-to-many exchange, many-to-one exchange and many-to-many exchange. One-to-many business exchange can be Online-Procurement system wherein there is one buyer and many vendors preferred or otherwise. Many-to-one business exchange can be Online Sales system where there is one supplier and many buyers. Many-to-many business exchange can be an online-product or online-service exchange where there are many buyers and many suppliers controlling the transactions by the supply-demand forces.

Figure 7A:
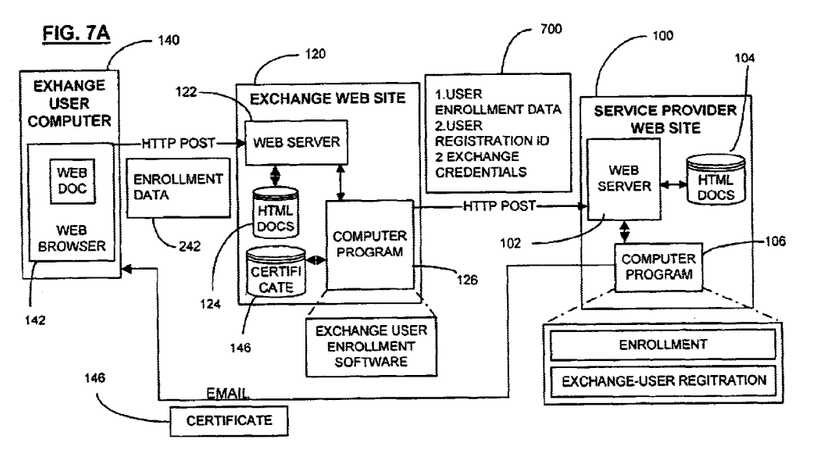
FIGS. 7A and 7B illustrate an additional embodiment for customer enrollment function and flowchart for exchange-user enrollment software of exchange computer respectively.
Figure 7B:
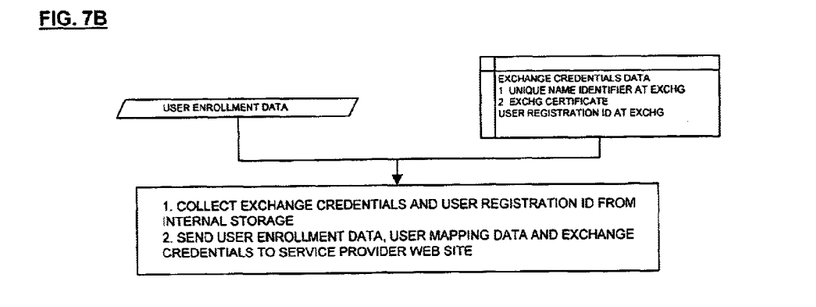

Additional Embodiments—FIGS. 7A, 7B:

FIG. 7A illustrates the additional embodiment for enrollment function. In preferred embodiment exchange-user enrolls at service provider Web site 100 directly. In addition to this, an exchange Web site 120 can also enroll an exchange user at service provider Web site 100, if that exchange-user has not been enrolled with service provider Web site 100 before.

Computer program 126 at exchange Web site includes additional embodiment for exchange-user enrollment software. FIG. 7B illustrates flowchart for this additional embodiment for enrollment software. In operation, at the time of user registration exchange Web site 120 accepts enrollment data also from the exchange user and forwards the enrollment request to service provider Web site on behalf of the exchange-user. Computer program 106 at service provider Web site 100 accepts both enrollment data and exchange-user registration data 700 and performs both the functions. It then sends generated certificate 146 to exchange-user by email so that it can be used for other exchange Web sites 120.

This helps exchange Web site 120 in giving a uniform and non-intrusive interface for exchange service and credibility-report generation service. It also helps exchange Web site 120 in reducing the number of operations used, by combining enrollment operation and exchange-user registration operation in the same request. This also helps exchange-user in having to use only one Web site i.e. exchange Web site 120.

Figure 8A:
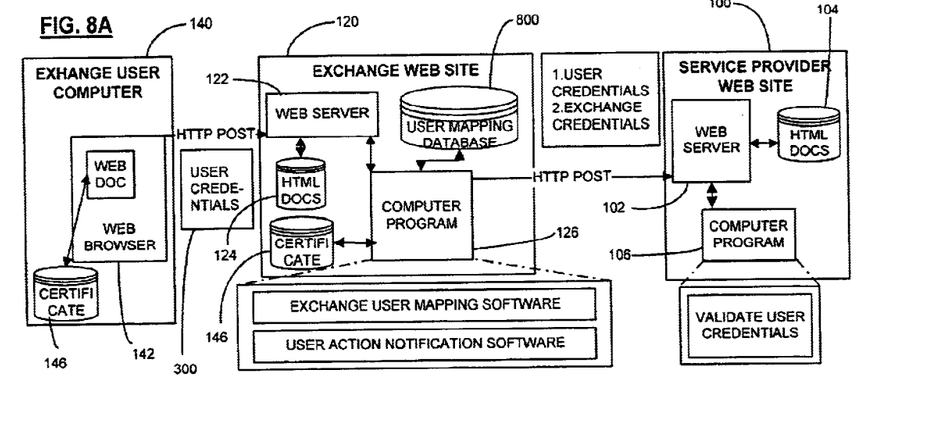
FIG. 8A illustrates an alternative embodiment for exchange-user mapping function.
Figure 8B:
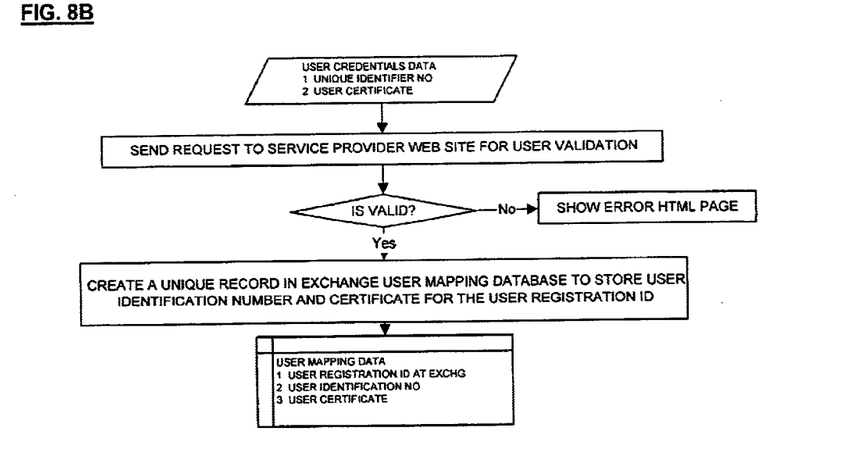
FIGS. 8B and 8C are flowcharts for exchange-user mapping software and user action notification of exchange computer respectively.
Figure 8C:
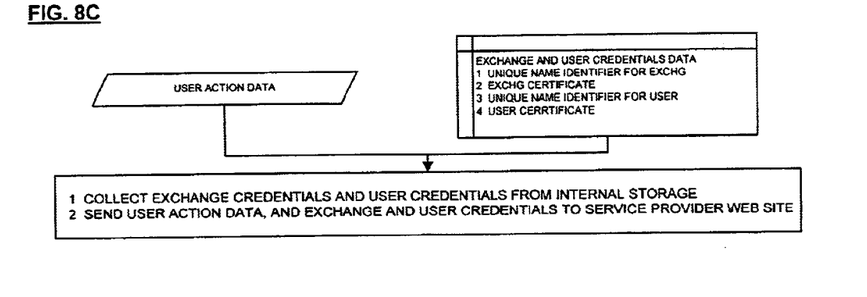

Alternative Embodiments—FIGS. 8A, 8B, 8C

FIG. 8A illustrates alternative embodiments for exchange-user mapping function. In preferred embodiment exchange Web site 120 provides the user mapping information to service provider Web site 100. Service provider Web site 100 stores this information in its registration database and then for later requests needs only user registration identifier 301 and exchange credentials 302 to ascertain the identity of exchange-user. In alternative embodiment exchange Web site 120 stores the user mapping information in its user mapping database 800 instead of service provider Web site 100.

FIG. 7A includes alternative embodiment for exchange-user mapping software and alternative embodiment for user action notification software to perform this operation. FIG. 7B illustrates flowchart for alternative embodiment for user mapping software. This software accepts user credentials 300 from exchange-user and validates the user credentials 300 by sending a request to service provider Web site. If valid, it stores the mapping information, user registration identifier 301 and user credentials 300, in its user mapping database 800. Fib 7C illustrates flowchart for alternative embodiment for user action notification software. This software accepts user action data 400, and exchange credentials 302. Then, It retrieves user credentials 300 and sends the user action notification request to service provider Web site 100.

This alternative embodiment even though does not affect utility of the invention is inferior to the preferred embodiment, because exchange Web site 120 has to add additional software and data storage. Also, since typically a service provider Web site 100 serves more than one exchange Web sites 120, the addition of the software will be in all the exchange Web sites.

CONCLUSIONS, RAMIFICATIONS, AND SCOPE

Accordingly, the reader will see that present invention tracks trade actions at specific steps of a transaction non-intrusively across independent marketplaces, collects and analyzes the data to produce credibility ratings that disclose intention of a participant to make a successful transaction. Present invention provides a completely new and unique way of identifying credibility of trade-participants. Present invention when implemented increases efficiency and effectiveness of electronic commerce and augments value of existing online exchanges. Process for generating ratings that is described above for electronic commerce and online exchanges can also be used effectively for general business transaction on the same principal of recording, tracking, and analyzing trade actions at specific steps of the transaction.

Although the description above contains many specifications, these should not be construed as limiting the scope of the invention but as merely providing illustrations of some of the presently preferred embodiments of this invention. The scope of the invention should be determined by the appended claims and their legal equivalents, rather than by the examples given.

I claim:

1. A method for displaying rating analysis in an on-line transaction by capturing, and analyzing data relating to trade actions for past as well current on-line transaction across multiple independent marketplaces with uniform rating criteria, comprising the steps of:

(a) recognizing using a computerized system, across a plurality of independent electronic marketplaces, credentials of a participant in said on-line transaction;

(b) validating and recording trade actions of said participant during said on-line transaction for an electronic marketplace independently and transparently, using said computerized system;

(c) storing and maintaining recorded trade action data for plurality of on-line transactions across plurality of independent electronic marketplaces, using said computerized system;

(d) analyzing, and correlating trade actions and transaction patterns from recorded data of said on-line transactions across said plurality of independent electronic marketplaces, using said computerized system;

(e) creating a rating analysis of said participant by utilizing uniform criteria across said plurality of independent electronic marketplaces and said analyzed and correlated trade actions and transaction patterns of said on-line transactions across said plurality of independent electronic marketplaces, using said computerized system; and (f) disclosing said rating analysis of said participant across said plurality of independent electronic marketplaces, using said computerized system, said rating analysis disclosing credibility of said participant to make an online trade.

2. A credibility reporting system comprising:

(a) a computer processor usable medium accessible for public or private electronic communication comprising:
      (1) a computer processor readable program embodied therein for providing an electronic transaction; and
      (2) a computer processor readable program embodied therein for providing notification of a trade action in said electronic transaction;

(b) a computer processor usable medium accessible for public or private electronic communication comprising:
      (1) a computer processor readable program embodied therein for recognizing credentials of a participant in a trade action across a plurality of independent electronic marketplaces;

(2) a computer processor readable program embodied therein for providing record of said trade actions of said participant;

(3) a computer processor readable program embodied therein for analyzing and correlating recorded trade actions and transaction patterns from recorded data of said trade actions across said plurality of independent electronic marketplaces;

(4) a computer processor readable program embodied therein for creating a rating analysis of said participant by utilizing uniform criteria across said plurality of independent electronic marketplaces and said analyzed and correlated trade actions across said plurality of independent electronic marketplaces; and (5) a computer processor readable program embodied therein for disclosing said rating analysis of said participant across said plurality of independent electronic marketplaces, said rating analysis disclosing credibility of said participant to make an online trade.

* * * * *